US006629543B2

(12) United States Patent
Kilgore

(10) Patent No.: US 6,629,543 B2
(45) Date of Patent: Oct. 7, 2003

(54) FUEL SYSTEM INCLUDING A SELF-CONTAINED FLOW-THROUGH PRESSURE REGULATOR

(75) Inventor: Jason T. Kilgore, Newport News, VA (US)

(73) Assignee: Siemens Automotive Corporation, Auburn Hills, MI (US)

( * ) Notice: Subject to any disclaimer, the term of this patent is extended or adjusted under 35 U.S.C. 154(b) by 0 days.

(21) Appl. No.: 09/920,620

(22) Filed: Aug. 3, 2001

(65) Prior Publication Data

US 2003/0024572 A1 Feb. 6, 2003

(51) Int. Cl.[7] .......... G05D 16/08

(52) U.S. Cl. .......... 137/12; 123/457; 137/508; 137/510

(58) Field of Search .......... 137/508, 510, 137/12; 123/457

(56) References Cited

U.S. PATENT DOCUMENTS 3,258,029 A 6/1966 Parrino
4,370,102 A 1/1983 Sasaki et al. .......... 137/510
4,431,026 A 2/1984 Fehrenbach et al. .......... 137/510
4,627,463 A 12/1986 Johnstone .......... 137/510
4,741,360 A 5/1988 Affeldt et al. .......... 137/510
5,220,941 A 6/1993 Tuckey .......... 137/510
5,265,644 A 11/1993 Tuckey .......... 137/510
5,413,077 A 5/1995 Hornby et al. .......... 123/457
5,435,344 A 7/1995 Robinson et al. .......... 137/508
5,435,345 A 7/1995 Robinson et al. .......... 137/508
5,509,444 A 4/1996 Robinson et al. .......... 137/508
5,636,616 A * 6/1997 Okane et al. .......... 123/510
5,901,742 A 5/1999 Kleppner et al. .......... 137/508
6,068,014 A 5/2000 Tomita .......... 137/508

* cited by examiner

*Primary Examiner*—Stephen M. Hepperle

(57) ABSTRACT

The present invention provides a fuel system for an internal combustion engine powered by fuel that includes a fuel tank having a wall defining a volume. The fuel system also includes a pump that is disposed proximate the fuel tank and operatively connected to the volume. The fuel system further includes piping that is coupled to the pump and is operatively connected to the internal combustion engine. A pressure regulator with a self-contained valve assembly is disposed in at least one of the pump or the piping.

29 Claims, 2 Drawing Sheets

FUEL SYSTEM INCLUDING A SELF-CONTAINED FLOW-THROUGH PRESSURE REGULATOR

FIELD OF THE INVENTION

This invention relates to a fuel system for an internal combustion engine, and more particularly to a fuel system including a flow-through pressure regulator with a self-contained valve assembly for a vehicle powered by a fuel injected combustion engine.

BACKGROUND OF THE INVENTION

Most modern automotive vehicles are powered by an internal combustion engine that is connected with a source of fuel, e.g., gasoline, diesel, natural gas, alcohol, hydrogen, etc. The fuel is stored on-board the vehicle and supplied to the engine in a precisely controlled manner.

According to a conventional fuel system, gasoline is stored in a tank on-board a vehicle. The gasoline is withdrawn from the tank by a pump and fed through a filter to fuel injectors, which deliver the gasoline to combustion cylinders in the engine. The fuel injectors are mounted on a fuel rail to which fuel is supplied by the pump. The pressure at which the fuel is supplied to the fuel rail must be metered to ensure the proper operation of the fuel injectors. Metering is carried out by using pressure regulators which control the pressure of the fuel in the system at all engine r.p.m. levels.

It is believed that some existing pressure regulators employ a spring biased valve seat with a longitudinal flow passage. The valve seat is biased to a closed position at low fuel pressures. As fuel pressure builds in the system, the pressure against the valve seat overcomes the biasing force of the spring, allowing fuel to flow through the valve seat, thereby controlling the fuel pressure in the system.

In this type of pressure regulator, the valve seat and valve member were distinct components with various parts. The components are located at different positions within the housing of the pressure regulator and provide a valve assembly with distributed operative parts. These parts are believed to require detailed machining to fabricate. Thus, it is believed that a flow-through pressure regulator is needed that has a valve assembly that can be fabricated with fewer machined components, as well as with fewer components overall and that is configured within the pressure regulator so that the components are contained with a single operative part, i.e., self-contained.

SUMMARY OF THE INVENTION

The present invention provides a fuel system for an internal combustion engine powered by fuel that includes a fuel tank having a wall defining a volume. The fuel system also includes a pump that is disposed proximate the fuel tank and operatively connected to the volume. The fuel system further includes piping that is coupled to the pump and is operatively coupled to the internal combustion engine. A pressure regulator with a self-contained valve assembly is disposed in at least one of the pump or the piping.

The present invention also provides a method of supplying fuel tank to an internal combustion engine using a pump, a pressure regulator, and piping connecting the fuel tank, internal combustion engine, pump, and pressure regulator. The pressure regulator includes a self-contained valve assembly and an inlet and an outlet offset along an axis. The method is achieved by disposing the valve assembly with a closure member in a fluid flow path between the inlet and the outlet. The valve assembly defines the communication path between the inlet and the outlet. The method is also achieved by occluding flow between the inlet and outlet through the communication path of the valve assembly with the closure member when the valve assembly is in a first position at a first pressure and by permitting flow between the inlet and outlet through the communication path of the valve assembly when the valve assembly is in a second position at a second pressure.

BRIEF DESCRIPTION OF THE DRAWINGS

The accompanying drawings, which are incorporated herein and constitute part of this specification, illustrate presently preferred embodiments of the invention, and, together with the general description given above and the detailed description given below, serve to explain the features of the invention.

DETAILED DESCRIPTION OF THE PREFERRED EMBODIMENT

Figure 1:
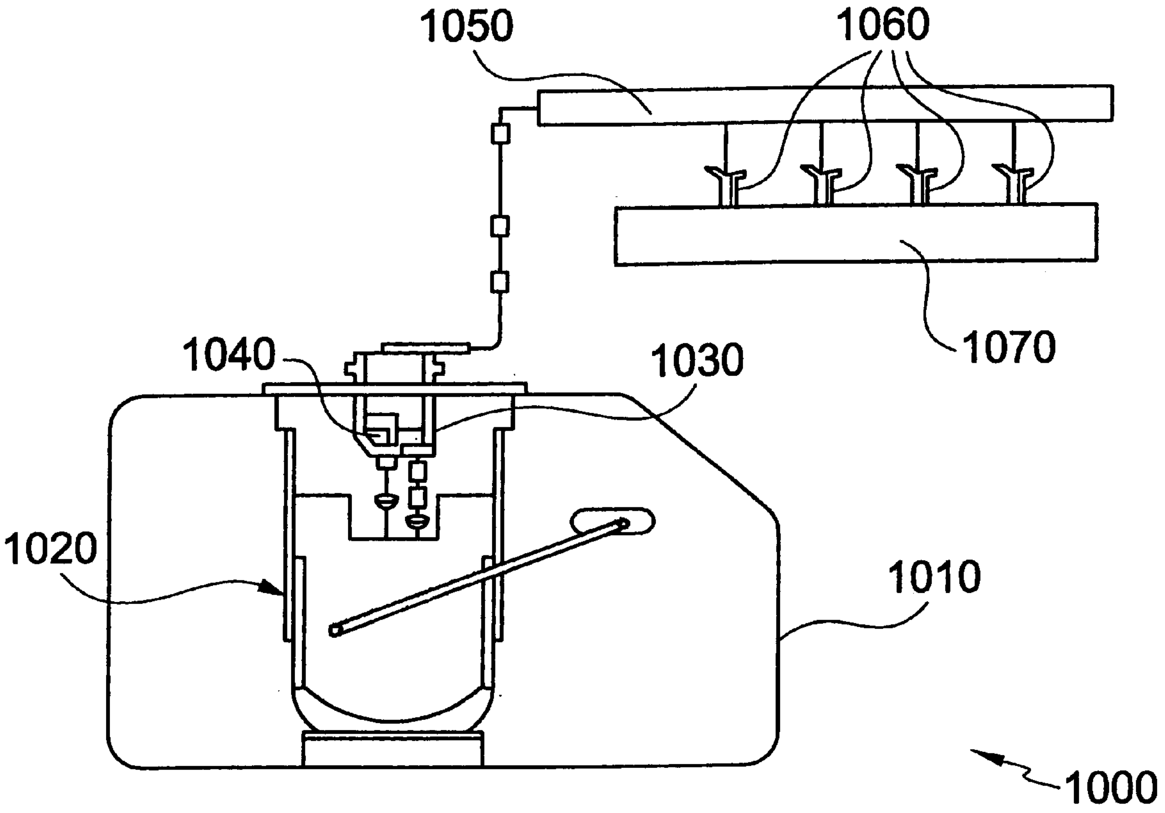
FIG. 1 illustrates a fuel system according to the present invention.

FIG. 1 illustrates a fuel system 1000 including a tank 1010, a pump 1020, a filter 1030, a pressure regulator 1040, a fuel rail 1050, at least one fuel injector 1060, and an internal combustion engine 1070. These components are interconnected by piping as will be described in greater detail below.

The tank 1010 holds fuel. The pump 1020 is shown connected to an inside of the fuel tank 1010. In other words, the pump 1020 can be secured to or retained to or supported by the inside of the fuel tank 1010. However, the pump 1020 can also be connected on an exterior of the tank 1010, or can be remotely connected with respect to the tank 1010. The filter 1030 and the pressure regulator 1040 are shown connected inside the pump 1020. However, the filter 1030 and the pressure regulator 1040, either individually or an integral combination, can also be connected on the exterior of the pump 1020, or can be connected remotely with respect to the pump 1020. The tank 1010, pump 1020, filter 1030, and pressure regulator 1040 can be coupled by piping such that the fuel 1012 can be filtered in the filter 1030 before entering the pump 1020, or between the pump 1020 and the fuel rail 1050. Coupling thus refers to any connection permitting fluid communication. The pressure regulator 1040 can be coupled to a tap in piping between the pump 1020 and the filter 1030, or between the filter 1030 and the fuel rail 1050. Fuel 1012 that is bled-off by the pressure regulator 1040 is returned to the pump 1020. The fuel 1012 supplied to the fuel rail 1050 is supplied to each of the injector(s) 1060, and subsequently supplied by the injector 1060 to the engine 1070, e.g., into individual combustion cylinders of the engine 1070.

Figure 2:
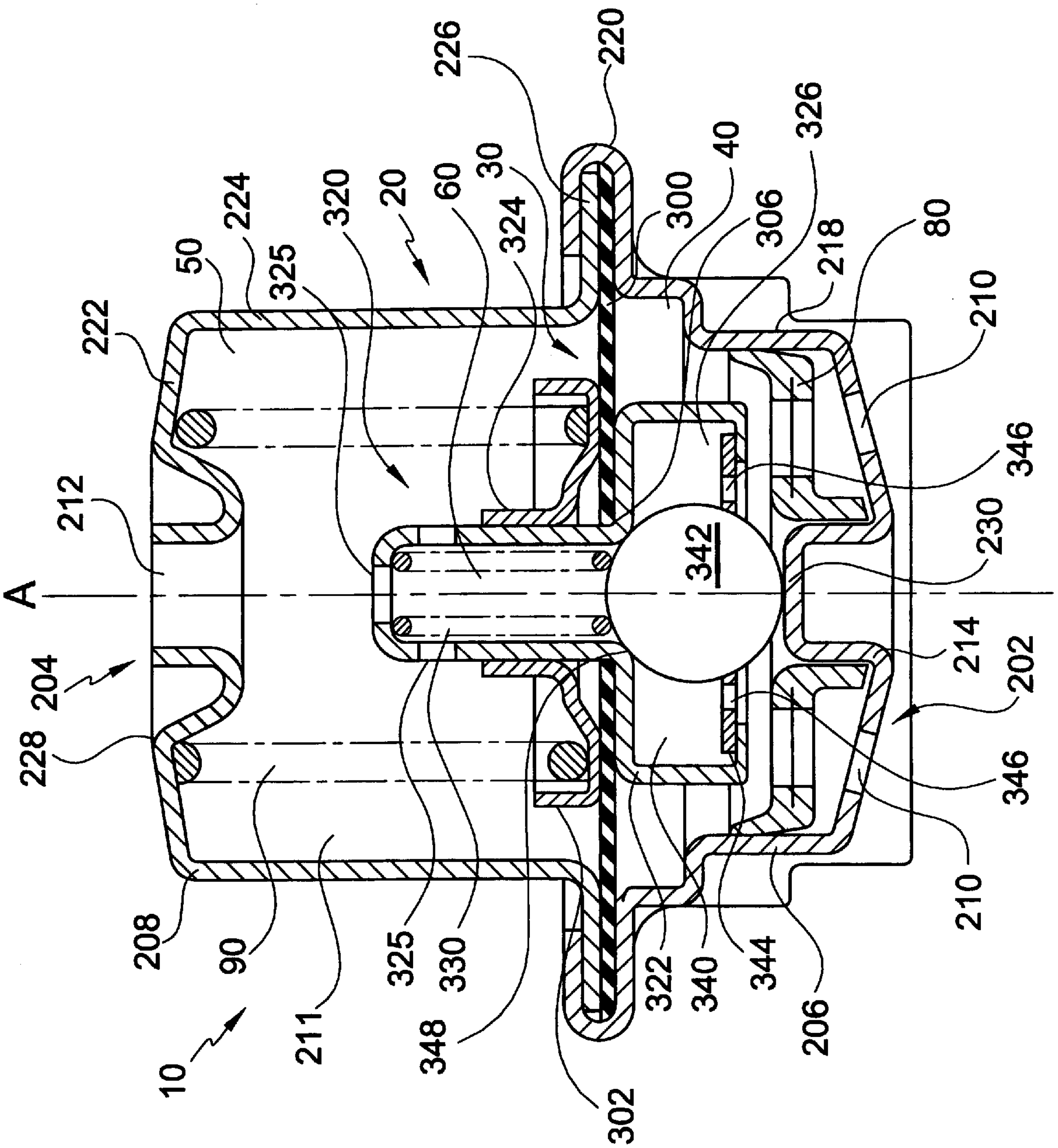
FIG. 2 illustrates a flow-through regulator according to a preferred embodiment of the invention.

FIG. 2 illustrates a flow-through pressure regulator 10 according to a preferred embodiment. The flow-through pressure regulator 10 includes a housing 20. The housing 20 is separated by a valve assembly 30 into a first chamber 40 and a second chamber 50. The valve assembly 30 has a passage 60 that communicates the first chamber 40 with the second chamber 50. The valve assembly 30 permits or inhibits flow through the passage 60. A filter 80 is disposed in the flow path of the housing 20. The housing 20 has an inlet 202 and an outlet 204 offset along a longitudinal axis A. The housing 20 can include a first cup-shaped member 206 and a second cup-shaped member 208 that are crimped together to form a unitary housing 20 with a hollow interior 211. Although the unitary housing 20 is formed by two joined members, it is to be understood that the unitary housing could be formed with multiple members integrated together, or alternatively, a monolithic member. Furthermore, while the preferred embodiment of the housing 20 includes cup-shaped members, the housing 20 can include other geometries as well, such as tubular-shaped members. The inlet 202 of the housing 20 is located in the first cup-shaped member 206, and the outlet 204 of the housing 20 is located in the second cup-shaped member 208. The inlet 202 can be a plurality of inlet apertures 210 located in the first cup-shaped member 206. The outlet 204 can be a port 212 disposed in the second cup-shaped member 208.

The first cup-shaped member 206 can include a first base 214, a first lateral wall 218 extending in a first direction along the longitudinal axis A from the first base 214, and a first flange 220 extending from the first lateral wall 218 in a direction substantially transverse to the longitudinal axis A. The second cup-shaped member 208 can include a second base 222, a second lateral wall 224 extending in a second direction along the longitudinal axis A from the second base 222, and a second flange 226 extending from the second lateral wall 224 in a direction substantially transverse to the longitudinal axis A. The valve assembly 30 includes a flexible divider 300, which can be a diaphragm. The divider 300 is secured between the first flange 220 and the second flange 226 to separate the first chamber 40 and the second chamber 50. The first flange 220 can be rolled over the circumferential edge of the second flange 226 and can be crimped to the second flange 226 to form the unitary housing 20.

In addition to the divider 300, the valve assembly 30 includes a tubular member 320 and a closure member 340. The tubular member 320 is located in a central aperture 306 of the divider 300 to provide the passage 60. The tubular member 320 includes a first tubular portion 322 and a second tubular portion 324. The first tubular portion 322 is disposed entirely within the first chamber 40 and has a diameter disposed along the axis. An upper surface of the first tubular portion 322 extends substantially transverse to the longitudinal axis A and contacts a lower operative surface of the divider 300. The first tubular portion 322 forms a chamber 326 housing the closure member 340. The second tubular portion 324 is disposed substantially within the second chamber 50 and has a diameter disposed along the axis. The diameter of the second tubular portion 324 is smaller than the diameter of the first tubular portion 322. An outer surface of the second tubular portion 324 is secured to a spring retainer 302, preferably by an interference fit. The outer surface of the second tubular portion 324, however, may be secured to the spring retainer 302 by staking or crimping. A lower end of the second tubular portion 324 extends beyond the divider 300 into the first chamber 40 and forms a unitary tubular junction 348 with an upper end of the first tubular portion 322. The second tubular portion 324 includes a plurality of tubular apertures 325 located in an end proximate the outlet 204 to provide a flow path through the passage 60.

The closure member 340 includes a ball 342 retained in a ball retainer 344. The ball retainer 344 is disposed in the chamber 326 housing the closure member 340 and can be a flat annulus secured within chamber 326 by a flange provided at the lower end of the first tubular portion 322. The flange of the lower end of the first tubular portion 322 allows for the ball retainer to move within the chamber 326. This can be achieved by providing an aperture in the ball retainer 344 with an outside diameter which is smaller than an inner diameter of the first tubular portion 322. The difference in diameters allows the ball retainer to move freely both axially and radially within the chamber 326. The ball retainer 344 has a central aperture and a plurality of retainer apertures 346 located along a circumference of the ball retainer 344. The central aperture of the ball retainer 344 is somewhat smaller than the diameter of the ball 342 and is finished to prevent a rough surface from contacting the ball 342. The plurality of retainer apertures 346 in the ball retainer 344 permit flow through the first tubular portion 322. An upper surface of the ball 342 seats on the tubular junction 348. A lower surface of the ball 342 seats on a seating surface 230 formed in a center portion of the first base 214 along the longitudinal axis A and opposite the tubular junction 348.

A first biasing element 330, which can be a spring, is disposed within an inner diameter of the second tubular portion 324, substantially within the second chamber 50. An outer surface of the first biasing element 330 contacts an inner diameter of the second tubular portion 324. The first biasing element 330 extends along the length of the second tubular portion 324. An upper end of the first biasing element 330 engages the end of the second tubular portion 324 proximate the outlet 204, while a lower end of the first biasing element 330 contacts the upper surface of the ball 342. The first biasing element 330 biases the ball 342 at a predetermined force toward the base 214.

A second biasing element 90, which can be a spring, is disposed entirely within the second chamber 50 and is concentric with the first biasing element 330. The second biasing element 90 engages a locator 228 on the base 222 of the second cup-shaped member 208 and biases the valve assembly 30 toward the base 214 of the first cup-shaped member 206. The second biasing element 90 biases the valve assembly 30 at a predetermined force, which relates to the pressure desired for the regulator 10. The base 222 of the second cup-shaped member 208 has a dimpled center portion that provides the outlet portion 212 in addition to the locator 228. A first end of the second biasing element 90 is secured on the locator 228, while a second end of the second biasing element 90 can be supported by the spring retainer 302.

The operation of the flow-through pressure regulator 10 will now be described. It is to be understood that the following description can also explain the operation of the invention when utilized as a pressure-relief device. The second biasing element 90 acts through the spring retainer 302 to bias the divider 300, and hence the valve assembly 70, toward the base 214 of the first cup-shaped member 206. The first biasing element 330 biases the ball 342 of the closure member 340, against the seating surface 230 in the base 214 of the first cup-shaped member 206. When the ball 342 is seated against the tubular junction 348, the valve assembly 70 is in a closed position, and no fuel can pass through the regulator 10.

Fuel enters the regulator 10 through inlet apertures 210 and exerts pressure on the valve assembly 70, including the divider 300. When the pressure of the fuel is greater than the force exerted by the second biasing element 90, the valve assembly 70 is displaced along the longitudinal axis A toward the outlet 204. The force exerted by the first biasing element 330 unseats the ball 342 from the tubular junction 348 creating a pathway for the fuel. Fuel enters the first tubular portion 322 around the ball 342 and through the plurality of retainer apertures 346 located in the ball retainer 344. The fuel enters the passage 60 through the gap created by the unseated ball 342 and exits the passage 60 along and transverse to the longitudinal axis A through the plurality of tubular apertures 325 located in the end of the second tubular portion 324 proximate the outlet 204.

As the fuel pressure is reduced, the force of the second biasing element 90 overcomes the fuel pressure and returns the tubular junction 348 to seated engagement with the ball 342, thus closing the passage 60. Operating in this manner, the regulator 10 is able to maintain constant fuel pressure in a fuel system.

While the invention has been disclosed with reference to certain preferred embodiments, numerous modifications, alterations, and changes to the described embodiments are possible without departing from the sphere and scope of the invention, as defined in the appended claims and their equivalents thereof. Accordingly, it is intended that the invention not be limited to the described embodiments, but that it have the full scope defined by the language of the following claims.

What is claimed is:

1. A fuel system for an internal combustion engine powered by fuel, comprising:

a fuel tank having a wall defining a volume;

a pump disposed proximate the fuel tank and operatively connected to the volume;

piping coupled to the pump and operatively coupled to the internal combustion engine; and a pressure regulator with a self-contained valve assembly that carries a closure member and disposed in at least one of the pump or piping, the valve assembly having a first biasing element that biases the closure member in a direction that permits fuel flow through the pressure regulator.

2. The fuel system of claim 1, wherein the pressure regulator is disposed within the volume.

3. The fuel system of claim 1, wherein the pressure regulator is connected to an interior surface of the wall.

4. The fuel system of claim 1, wherein the pressure regulator is coupled to the pump.

5. The fuel system of claim 1, wherein the pressure regulator is disposed outside the volume.

6. The fuel system of claim 1, wherein the pressure regulator is connected to an exterior surface of the wall.

7. The fuel system of claim 1, further comprising:

a filter adapted for filtering the fuel, the filter being interposed in fluid communication along the piping, and adapted to be interposed between the tank and the internal combustion engine.

8. The fuel system of claim 7, wherein the pressure regulator is in fluid communication along the piping, and adapted to be interposed between the pump and the filter.

9. The fuel system of claim 7, wherein the pressure regulator is in fluid communication along the piping, and adapted to be interposed between the filter and the internal combustion engine.

10. The fuel system of claim 1, wherein the pressure regulator includes:

a housing having an inlet and an outlet offset along an axis; and the valve assembly being disposed between the inlet and outlet along the axis separating the housing into a first chamber and a second chamber, the valve assembly being positional in a first position that inhibits flow between the first chamber and the second chamber through the valve assembly.

11. The fuel system of claim 10, wherein the valve assembly comprises a flexible divider having a first operative surface and a second operative surface, the first operative surface being exposed to the first chamber, the second operative surface being exposed to the second chamber, a tubular member coupled to the first surface and the second surface, the tubular member having a passage along the axis that communicates the first chamber with the second chamber, when the valve assembly is in the second position.

12. The fuel system of claim 10, wherein the tubular member comprises a first tubular portion and a second tubular portion, the first tubular portion having a major diameter disposed along the axis and the second tubular portion having a minor diameter disposed along the axis.

13. The fuel system of claim 12, wherein the first tubular portion is disposed in the first chamber and the second tubular portion is disposed substantially in the second chamber.

14. The fuel system of claim 13, wherein a lower end of the second tubular portion extends from the second chamber, through the divider and into the first chamber, the lower end of the second tubular portion and an upper end of the first tubular portion forming a tubular junction.

15. The fuel system of claim 14, wherein the first biasing element is disposed within the second tubular portion, biases the closure member toward the inlet, and a second biasing element, disposed in the second chamber and concentric with the first biasing element, biases the valve assembly toward the inlet.

16. The fuel system of claim 15, wherein an outer surface of the second tubular portion is secured by interference to a retaining element.

17. The fuel system of claim 16, wherein the valve seat comprises a first surface disposed along the axis in the first chamber and a second surface disposed along the axis in the first chamber.

18. The fuel system of claim 17, wherein the first surface of the valve seat includes the tubular junction and the second surface of the valve seat includes a portion of the housing.

19. The fuel system of claim 18, wherein the closure member comprises a spherical portion disposed in a retainer, the retainer being coupled to the first tubular portion.

20. The fuel system of claim 19, wherein the housing comprises a first cup-shaped member and a second cup-shaped member, the first cup-shaped member having a first base, a first lateral wall extending in a first direction along the axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing.

21. The fuel system of claim 20, wherein the second surface of the valve seat includes a portion of the first base having a configuration complementary to the closure member.

22. The fuel system of claim 21, wherein the valve assembly is secured between the first flange and the second flange.

23. A method of supplying fuel from a fuel tank to an internal combustion engine using a pump, a pressure regulator, and piping connecting the fuel tank, internal combustion engine, pump, and pressure regulator, the pressure regulator having a self-contained valve assembly and including an inlet and an outlet offset along an axis, the method comprising:

disposing the valve assembly with a closure member in a fluid flow path between the inlet and the outlet, the valve assembly defining the communication path between the inlet and the outlet;

occluding flow between the inlet and outlet through the communication path of the valve assembly with the closure member, the valve assembly being in a first position at a first pressure; and permitting flow between the inlet and the outlet through the communication path of the valve assembly via a first biasing element that biases the closure member away from a seat of the valve assembly, the valve assembly being in a second position at a second pressure less than a first pressure to regulate a pressure of the fuel being supplied to the engine.

24. The method of claim 23, further comprising:

providing the valve assembly with a flexible divider, the divider being substantially transverse to the axis;

providing the divider with a first operative surface and a second operative surface;

suspending a tubular member by the divider;

providing the tubular member with a passage along the axis that communicates the first chamber with the second chamber; and providing the valve assembly with a valve seat.

25. The method of claim 24, wherein the tubular member comprises a first tubular portion and a second tubular portion, the first tubular portion having a major diameter disposed along the axis and the second tubular portion having a minor diameter disposed along the axis.

26. The method of claim 25, further comprising:

disposing the first tubular portion entirely in the first chamber;

disposing the second tubular portion substantially in the second chamber, a lower end of the second tubular portion extending past the divider;

forming a tubular junction with the lower end of the second tubular portion and an upper end of the first tubular portion;

disposing a first biasing element within the second tubular portion, the first biasing element biasing the closure member toward the inlet; and disposing a second biasing element in the second chamber and concentric with the first biasing element, the second biasing element biasing the valve assembly toward the inlet.

27. The method of claim 26, wherein the valve seat comprises a first surface disposed along the axis in the first chamber and the second surface disposed along the axis in the first chamber, the first surface including the tubular junction and the second surface including a portion of the housing adapted to support a surface of the closure member.

28. The method of claim 27, further comprising:

disposing a spherical portion of the closure member in a retainer; and coupling the retainer to the first tubular portion.

29. The method of claim 28, wherein the housing comprises a first cup-shaped member and a second cup-shaped member, the first cup-shaped member having a first base, a first lateral wall extending in a first direction along the axis from the first base, and a first flange extending from the first lateral wall in a direction substantially transverse to the axis, the second cup-shaped member having a second base, a second lateral wall extending in a second direction along the axis from the second base, and a second flange extending from the second lateral wall in a direction substantially transverse to the axis, the first flange and the second flange being secured together to provide a unitary housing.

* * * * *